United States Patent [19]

deVry et al.

[11] 4,145,514

[45] Mar. 20, 1979

[54] POLYURETHANE PRESSURE-SENSITIVE ADHESIVE AND LAMINATES THEREFROM

[75] Inventors: William E. deVry; Ralph S. Drake, both of Lakewood; Richard T. Morrissey, Cuyahoga Falls, all of Ohio

[73] Assignee: The B. F. Goodrich Company, Akron, Ohio

[21] Appl. No.: 829,691

[22] Filed: Sep. 1, 1977

[51] Int. Cl.$^2$ .................... B32B 27/40; C08G 18/62; C08G 18/63
[52] U.S. Cl. ...................................... 528/75; 528/73; 528/905; 428/425
[58] Field of Search ................. 260/77.5 CR; 528/73, 528/75, 905; 428/425

[56] References Cited

U.S. PATENT DOCUMENTS

| | | | |
|---|---|---|---|
| 3,028,367 | 4/1962 | O'Brien | 260/77.5 CR |
| 3,245,941 | 4/1966 | Mayer et al. | 260/31.6 |
| 3,369,959 | 2/1968 | Noyes | 260/77.5 CR |
| 3,532,652 | 10/1970 | Zang et al. | 260/77.5 CR |
| 3,553,174 | 1/1971 | Hausslein et al. | 260/77.5 CR |
| 3,681,289 | 8/1972 | Kruse et al. | 260/77.5 CR |
| 3,853,822 | 12/1974 | Brod et al. | 260/77.5 CR |
| 3,970,717 | 7/1976 | Mueller-Albrecht et al. | 260/77.5 CR |

*Primary Examiner*—H.S. Cockeram
*Attorney, Agent, or Firm*—Charles A. Crehore

[57] ABSTRACT

A pressure-sensitive adhesive comprises the reaction product of (A) at least one alkyl acrylate liquid polymer containing both terminal and random hydroxyl functionality, and (B) at least one prepolymer of a polyester glycol or a polyalkylene ether glycol with an excess amount of an aromatic diisocyanate. The adhesive has a full range of desirable adhesive properties, including excellent rolling ball tack, 180° peel adhesion and shear adhesion. The adhesive is useful in both solvent and solvent-free systems.

35 Claims, No Drawings

POLYURETHANE PRESSURE-SENSITIVE ADHESIVE AND LAMINATES THEREFROM

BACKGROUND OF THE INVENTION

Pressure-sensitive adhesives made from either hydroxyl-terminated polymers or random-hydroxylated polymers are known in the art. U.S. Pat. No. 3,515,773 discloses preparation of pressure-sensitive adhesives from (A) a hydroxyl-terminated diene polymer, and (B) an isocyanate-terminated polyether prepolymer. U.S. Pat. No. 3,532,652 teaches preparation of pressure-sensitive adhesives from (A) an acrylate polymer containing a hydroxylated monomer randomly polymerized therein, and (B) an isocyanate-terminated polyester or polyether prepolymer. Such adhesives typically are deficient in one or two of the properties of rolling ball tack, 180° peel adhesion and shear adhesion. A new pressure-sensitive adhesive is desired having a full range of desirable adhesive properties, including excellent rolling ball tack, 180° peel adhesion and shear adhesion.

SUMMARY OF THE INVENTION

A pressure-sensitive adhesive comprises the reaction product of (A) at least one alkyl acrylate liquid polymer containing both terminal and random hydroxyl-functionality, and (B) at least one prepolymer of a polyester glycol or a polyalkylene ether glycol with an excess amount of an aromatic diisocyanate.

DETAILED DESCRIPTION

A pressure-sensitive adhesive is prepared by reacting (A) at least one alkyl acrylate liquid polymer containing both terminal and random hydroxyl functionality, and (B) at least one prepolymer of a polyester glycol or a polyalkylene ether glycol with an excess amount of an aromatic diisocyanate.

I. ALKYL ACRYLATE LIQUID POLYMERS

Alkyl acrylate liquid polymers suitable for use in the composition of this invention must contain both terminal and random hydroxyl functionality. The hydroxyl-containing alkyl acrylate liquid polymers contain an average from about 1.4 to about 6 hydroxyl groups per molecule, more preferably from about 1.7 to about 3.5 hydroxyl groups per molecule.

Random Hydroxyl Functionality

Random hydroxyl functionality is defined as the presence of hydroxyl group(s) which are pendant from a portion of the polymeric backbone other than the ends, e.g., when a hydroxyl-containing comonomer such as 2-hydroxyethyl acrylate or vinyl benzyl alcohol is used. Excellent results were obtained using 2-hydroxyethyl acrylate. Alternatively, a carboxylated comonomer such as acrylic acid or the like may be used, and after polymerization to prepare the alkyl acrylate liquid polymer is complete, some or all of the carboxyl groups may be reacted with ethylene oxide, butanediol, or the like to produce hydroxyl groups. Excellent results were obtained using ethylene oxide, which when reacted with acrylic acid units in the polymeric backbone, produced backbone units equivalent to 2-hydroxyethyl acrylate.

Terminal Hydroxyl Functionality

Terminal hydroxyl groups are included in the alkyl acrylate liquid polymers using methods known in the art. Suitable methods include the four that follow, with methods 1 and 4 being preferred.

Method #1

A carboxyl-terminated alkyl acrylate liquid polymer intermediate can be produced by the method of Siebert U.S. Pat. No. 3,285,949, i.e., by polymerizing at least one alkyl acrylate monomer in a solvent with low chain transfer potential, preferably t-butanol, using a bis-azocyano acid initiator having the formula

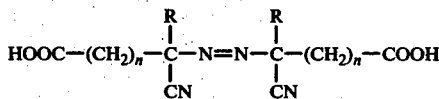

wherein n is an integer from 1 to 6 and R is an alkyl group containing 1 to 3 carbon atoms. Azodicyanovaleric acid is a preferred initiator for production of the carboxyl-terminated liquid polymer intermediate. Terminal hydroxyl groups may be introduced by reacting the carboxyl-terminated intermediate with ethylene oxide in the presence of a tertiary amine catalyst such as trimethylamine according to the process of Siebert U.S. Pat. No. 3,712,916.

Method #2

Alternatively, the carboxyl-terminated intermediate just described may be reacted with a diol in the presence of an acid catalyst according to the process of Siebert U.S. Pat. No. 3,699,153. The resulting product is a hydroxyl-terminated alkyl acrylate liquid polymer.

Method #3

Hydroxyl-terminated liquid polymers containing sulfide linkages near the terminal portions of the polymer molecule are prepared by photopolymerizing at least one alkyl acrylate in the presence of (a) at least one hydroxyl-containing disulfide and (b) ultraviolet radiation. The hydroxyl-containing disulfides may have the formula

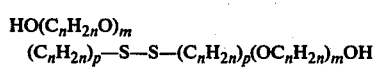

or

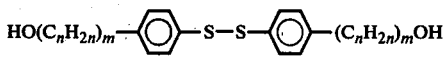

wherein m is an integer from 0 to 10, more preferably from 0 to 4, n is an integer from 1 to 10, more preferably from 1 to 4, and p is an integer from 1 to 10, more preferably from 1 to 4. Examples of suitable hydroxyl-containing disulfides include 2-hydroxyethyl disulfide, 3-hydroxypropyl disulfide and the like. Excellent results were obtained using 2-hydroxyethyl disulfide. The disulfide acts both as a polymerization initiator and as a polymerization modifier. The amount of hydroxyl-containing disulfide will vary according to the desired polymeric molecular weight but typically is from about 1 to 20 weight percent, more preferably from 1 to 10 weight percent, based upon total monomeric weight.

Ultraviolet (UV) radiation suitable for use in method #3 may have a wave length from about 1850 Å to about 6,000 Å, more preferably from about 2,400 Å to about 4,000 Å. Common sources of UV radiation include mercury lamps and arcs, carbon arcs and hydrogen discharge tubes. The vessel in which the polymerization is conducted may be transparent to light of the desired wave length, with the UV light source located external to the vessel so that light can pass through the sides of the vessel. Suitable glasses are available commercially and include borosilicates ("Pyrex"), "Vycor" or soft glass. Alternatively the UV light source may be placed within the reaction vessel, either directly above the surface of the reaction mixture or within the mass of the reaction mixture. In some cases a sensitizer may be useful in catalytic amounts to accelerate the photopolymerization, including ketones such as acetone, benzophenone and the like.

The photopolymerization may be conducted by any method known to the art, including bulk, solution, suspension and emulsion methods. Solvents for the monomer and/or polymer can be used during polymerization, including benzene, aliphatic hydrocarbons such as hexane and heptane, and alcohols such as methanol, ethanol, t-butanol and the like. Well-known suspension techniques comprise suspending the monomeric material, preferably already mixed with the hydroxyl-containing disulfide, in the form of small particles in a non-solvent liquid such as water, together with a suspending agent to aid in maintaining the particles separate from one another during polymerization. Suitable suspending agents include starch, carboxymethylcellulose and the like. Emulsion polymerization is similar, except that emulsifiers are used to produce much smaller particles and the end product is a stable aqueous emulsion of the polymer. Suitable emulsifiers include sodium or potassium fatty acid soaps, sodium alkaryl sulfonates, and the like.

Method #4

Hydroxyl-terminated liquid polymers containing sulfide linkages near the terminal portions of the polymer are prepared by thermal polymerization (typically at about 80°–90° C.) of at least one alkyl acrylate in the presence of (a) at least one hydroxyl-containing disulfide described heretofore and (b) an initiator such as azoisobutyronitrile. Solvents, suspending agents, sensitizers, etc. may be the same as for method #3 described heretofore.

Air or oxygen has an inhibiting effect on the reactions by the above four methods and preferably is excluded from the reaction vessel. Therefore, the reaction vessel desirably is flushed with nitrogen before the vessel is charged, and a nitrogen purge may be continued if necessary to exclude air during polymerization. The reaction generally is conducted with stirring at about 80°–90° C., with cooling provided if necessary. The polymerization rate may be monitored by withdrawing reaction mixture samples at periodic intervals for percent conversion analysis. The reaction can be run to 100% conversion, but it generally is more economical to run to about 70–98% conversion and recover unreacted monomer for reuse. The hydroxyl-containing liquid polymer may be purified by vacuum distillation or by washing with water in order to remove the unreacted hydroxyl-containing disulfide, followed by drying the polymer. The structure of the hydroxyl-containing liquid polymer can be confirmed by infrared analysis, together with well-known wet chemical methods for determination of hydroxyl and sulfur content. Number average molecular weights ($\overline{M}_n$) can be measured using vapor pressure osmometry, gel permeation chromatography or the like.

Molecular Weight And Polymer Backbone

The alkyl acrylate liquid polymers containing both terminal and random hydroxyl functionality may have molecular weights ($\overline{M}_n$) from about 1,000 to about 6,000 as determined by cryoscopic, ebullioscopic or osmometric methods; more preferably the molecular weights may be from about 2,000 to about 4,000. The hydroxylated liquid alkyl acrylate polymers may have Brookfield viscosities at 25° C. from about 50,000 cps. to about 2,000,000 cps., more preferably from about 200,000 cps. to about 1,000,000 cps.

The hydroxylated liquid acrylate polymers contain polymerized therein at least about 65 wt.%, more preferably at least about 85 wt.%, of at least one alkyl acrylate wherein the alkyl group contains from 3 to 10 carbon atoms, more preferably from 3 to 8 carbon atoms. The alkyl acrylate forms the backbone of the hydroxylated liquid polymer. Examples of suitable alkyl acrylates as the primary components of the polymer backbone include n-butyl acrylate, n-hexyl acrylate, 2-ethylhexyl acrylate and the like, and mixtures thereof. Excellent results were obtained using n-butyl acrylate. Of course, the hydroxylated liquid acrylate polymers also contain groups providing terminal and random hydroxyl functionality as described in detail heretofore. The balance of the polymer, typically from 0 to 32 wt.%, may contain copolymerized therein at least one other olefinically unsaturated monomer, more preferably at least one other vinylidene monomer (i.e., a monomer containing at least one terminal $CH_2=C<$ group per molcule) in the polymeric backbone.

Preferred vinylidene comonomers in the polymeric backbone include (a) dienes containing 4 to 10 carbon atoms, more preferably 4 to 8 carbon atoms, such as butadiene, isoprene, 2-isopropyl -1,3-butadiene, chloroprene, and the like; (b) vinyl nitriles having the formula

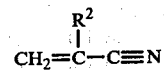

wherein $R^2$ is hydrogen or an alkyl group containing 1 to 3 carbon atoms, such as acrylonitrile, methacrylonitrile, and the like; and (c) acrylates having the formula

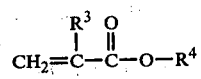

wherein $R^3$ is hydrogen or an alkyl radical containing 1 to 3 carbon atoms, and $R^4$ is hydrogen or an alkyl radical containing 1, 2 or 11 to 18 carbon atoms, or an alkoxyalkyl, alkylthioalkyl, or cyanoalkyl radical containing 2 to 12 carbon atoms; more preferably 2 to 8 carbon atoms. Alternatively $R^3$ may be an alkyl radical containing 1 to 3 carbon atoms and $R^4$ an alkyl radical containing 3 to 10 carbon atoms. Suitable acrylates include ethyl acrylate, dodecyl acrylate, octadecyl acrylate, methoxyethyl acrylate, butoxyethyl acrylate, hexylthioethyl acrylate β-cyanoethyl acrylate, cyanooctyl acrylate, methyl methacrylate and the like. Comonomeric mixtures may also be used. Excellent results were obtained using butadiene, ethyl acrylate and/or acrylonitrile comonomers together with n-butyl acrylate as the principal monomer.

Other suitable vinylidene comonomers include (d) vinyl aromatics having the formula

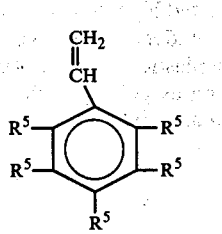

wherein $R^5$ is hydrogen, halogen or an alkyl radical containing 1 to 4 carbon atoms, such as styrene, methyl styrene, chlorostyrene, vinyl toluene and the like; (e) vinyl and allyl esters of carboxylic acids containing 2 to 8 carbon atoms such as vinyl acetate, vinyl propionate, allyl acetate, and the like: (f) vinyl and allyl ethers of alkyl radicals containing 1 to 8 carbon atoms such as vinyl methyl ether, allyl methyl ether, and the like; and (g) monoolefins containing 2 to 14 carbon atoms, more preferably 2 to 8 carbon atoms, such as ethylene, propylene, isobutylene, 1-butene, 1-pentene, 1-hexene, 1-dodecene and the like.

Also suitable as vinylidene comonomers are (h) vinyl halides such as vinyl bromide, vinyl chloride and the like; (i) divinyls and diacrylates such as divinyl benzene, divinyl ether, diethylene glycol diacrylate, and the like; (j) amides of α,β-olefinically unsaturated carboxylic acids containing 2 to 8 carbon atoms such as acrylamide and the like; (k) hydroxyl-containing vinylidene monomers for the purpose of including some random hydroxyl functionality as defined heretofore, such as 2-hydroxyethyl acrylate, allyl alcohol, vinyl benzyl alcohol and the like; and (1) other vinylidene monomers such as bis (β-chloroethyl vinyl phosponate, N-vinyl pyrrolidone, diacetone acrylamide, and the like. Excellent results were obtained using 2-hydroxyethyl acrylate, N-vinyl pyrrolidone and diacetone acrylamide.

Examples of useful polymeric backbones in the hydroxylated liquid alkyl acrylate polymers include poly(butyl acrylate/butadiene/acrylic acid) and poly(butyl acrylate/N-vinyl pyrrolidone/acrylic acid), wherein the acrylic acid moiety is hydroxylated after polymerization using ethylene oxide or the like to provide random hydroxyl group(s) in a backbone unit equivalent to those derived from 2-hydroxyethyl acrylate. Also suitable are poly(n-butyl acrylate/2-hydroxyethyl acrylate), poly(n-butyl acrylate/2-hydroxyethyl acrylate/N-vinyl pyrrolidone), poly(n-butyl acrylate/ethyl acrylate/2-hydroxyethyl acrylate/N-vinyl pyrrolidone), and poly(n-butyl acrylate/butadiene/2-hydroxyethyl acrylate/acrylonitrile). In the latter four backbones random hydroxylation is provided using 2-hydroxyethyl acrylate. Of course, each polymer backbone has terminal hydroxyl functionality linked thereto by method(s) such as the four described heretofore. It is essential that the alkyl acrylate liquid polymer contain both terminal and random hydroxyl functionality.

II. PREPOLYMER OF GLYCOL AND DIISOCYANATE

Component (B) of the pressure sensitive adhesive of the present invention comprises a prepolymer of a polyester glycol or a polyalkylene ether glycol with an excess amount of an aromatic diisocyanate. Suitable polyalkylene ether glycols are produced by methods well known to the art, contain from 3 to 6 carbon atoms per alkylene group, and have a molecular weight from about 400 to about 2,000, such as polypropylene ether glycol, polytetramethylene ether glycol (PTMEG) and the like. Preferred polyalkylene ether glycols contain from 3 to 5 carbon atoms per alkylene group and have a molecular weight from about 400 to 1,500. Excellent results were obtained using polytetramethylene ether glycol having a molecular weight of about 600. Mixtures of polyalkylene ether glycols may also be used.

Polyester glycols are less preferred for use in the prepolymers. Polyester glycols may be prepared by methods well known to the art for use in the prepolymer, e.g., by an esterification reaction of an aliphatic dicarboxylic acid or anhydride thereof with a glycol. Molar ratios of more than 1 mole of glycol to acid are preferred in order to obtain linear chains containing a preponderance of terminal hydroxyl groups. Suitable aliphatic dicarboxylic acids include adipic, succinic, pimelic, suberic, azelaic, sebacic, and the like or their anhydrides. Preferred dicarboxylic acids are those of the formula HOOC—R—COOH, wherein R is an alkylene radical containing 2 to 8 carbon atoms. More preferred are those represented by the formula $HOOC(CH_2)_x COOH$, wherein x is a number from 2 to 8. Adipic acid is preferred. The glycols used in the preparation of the polyester by reaction with an aliphatic dicarboxylic acid preferably straight chain glycols containing between 4 and 10 carbon atoms such as 1,4-butanediol, 1,6-hexanediol, 1,8-octanediol and the like. In general the glycol is preferably of the formula $HO(CH_2)_xOH$, wherein x is 4 to 8. The preferred glycol is 1,4-butanediol.

Aromatic diisocyanates suitable for use in the isocyanate-terminated prepolymers contain from 8 to about 24 carbon atoms, preferably from 8 to 16 carbon atoms. Examples of suitable aromatic diisocyanates include p-phenylene diisocyanate, 2,4 and 2,6 isomers of toluene diisocyanate (TDI), 4,4'-biphenylene diisocyanate, 4,4'-diphenylmethylene diisocyanate (MDI), 1,5-naphthylene diisocyanate and the like. Mixtures of aromatic diisocyanates may also be used. Excellent results were obtained using mixtures of 2,4-toluene diisocyanate and 2,6-toluene diisocyanate, particularly a mixture of about 65 wt.% 2,4-toluene diisocyanate and 35 wt.% 2,6-toluene diisocyanate, and a mixture of about 80 wt.% 2,4-toluene diisocyanate and 20 wt.% 2,6-toluene diisocyanate.

The isocyanate-terminated prepolymers may be prepared by reacting an excess (in equivalents) of the aromatic diisocyanate with the polyester glycol or polyalkylene ether glycol described heretofore. The prepolymers may have molecular weights from about 800 to about 3,000, preferably from about 900 to about 2,000. The prepolymers must contain excess isocyanate(free NCO), typically from about 2 wt.% to about 10 wt.% excess, more preferably from about 4 wt.% to about 7 wt.% excess based upon prepolymer weight. Excellent results were obtained using a prepolymer of toluene diisocyanate and polytetramethylene ether glycol, the glycol having a molecular weight of about 1,350 and about 6 wt.% free NCO, sold under the trademark Adiprene L-167 by E. I. duPont de Nemours & Co. Excellent results also were obtained using a prepolymer of toluene diisocyanate and polypropylene ether glycol, the prepolymer having a molecular weight of about 1,775 and about 5 wt.% free NCO, sold under the trademark Castomer E-0002 by Witco Chemical Corporation.

The isocyanate-terminated prepolymers may be blocked using known blocking agents such as phenols, tertiary alcohols, hydrocyanic acid, oximes such as methyl ethyl ketoxime, and the like. The blocked prepolymer and a both random- and terminal-hydroxylated alkyl acrylate liquid polymer described heretofore may be mixed to form the adhesive composition of the present invention. Blocking allows storage of the mixture for extended time periods at ambient temperatures without substantial reaction and without adverse effects upon ultimate adhesive properties. The blocked prepolymer in the mixture may be unblocked by heating, typically to about 100°–150° C., and the adhesive composition cured to its final pressure-sensitive state.

III. PRESSURE-SENSITIVE ADHESIVE

The pressure-sensitive adhesive of the present invention comprises the reaction product of (A) at least one alkyl acrylate liquid polymer containing both terminal and random hydroxyl functionality, ester (B) at least one prepolymer of a polyester glycol or a polyalkylene ether glycol with an excess amount of an aromatic diisocyanate. The adhesive has a full range of suitable adhesive properties, including excellent rolling ball tack, 180° peel adhesion and shear adhesion.

The hydroxylated acrylate liquid polymer (A) is used in a ratio to isocyanate-terminated prepolymer (B) sufficient to provide a ratio of about 0.7 to about 4.5 hydroxyl equivalents per free isocyanate equivalent. A preferred ratio is about 1.2 to about 4 hydroxyl equivalents per equivalent of free isocyanate.

Catalysts well known to the art may be used for the hydroxyl-isocyanate reaction, typically in amounts from about 0.001% to about 0.5% by weight of total reactants. Suitable catalysts include stannous salts of aliphatic carboxylic acids containing from 1 to 20 carbon atoms, such as stannous octate, stannous neodecanoate and the like. Other suitable catalysts include lead naphthenate, dibutyl tin dilaurate, and the like. Excellent results were obtained using dibutyl tin dilaurate.

A solvent for the pressure-sensitive adhesive composition need not be used in order to avoid toxicity and flammability problems, excessive bulk per unit amount of adhesive, and extra costs of the solvent itself. However, a solvent or solvent mixture may be desired in some cases to enhance compatibility and flow properties of the pressure-sensitive adhesive components before and during reaction. As is usually true with isocyanate-containing compositions, it is desirable to exclude as much water as possible; therefore, the solvents should be as anhydrous as possible. Suitable solvents include liquid aromatic hydrocarbons such as benzene, toluene, xylene, mesitylene and the like; liquid ketones such as methyl ethyl ketone, methyl butyl ketone and the like; liquid chlorinated hydrocarbons such as methylene chloride, 1,1,1-trichloroethane and the like; liquid esters such as ethyl acetate, ethoxyethyl acetate and the like; and liquid alkanes such as pentane, hexane, heptane and the like. Solvent mixtures may also be used. Excellent results were obtained using toluene together with ethyl acetate.

A tackifying additive is not required but may be used to impart increased pressure-sensitivity and tackiness to an adhesive of this invention. A tackifier may be used in an amount from about 10 to about 30 parts by weight and more of tackifier per 100 parts by weight of adhesive. Suitable tackifying additives include chlorinated biphenyl resins, such as chlorinated biphenyl and chlorinated polyphenyl; coumarone-indene resins, such as polymerized coal-tar light oils; plasticizers such as dioctyl phthalate; polystyrenes such as poly($\alpha$-methyl styrene); polyterpene resins, such as poly($\beta$-pinene); rosin and rosin derivatives, such as the glycerol ester of hydrogenated rosin and methyl ester of hydrogenated rosin; and the like. Chain extenders may be used, including polyols such as the glycols described in connection with preparation of the isocyanate-terminated prepolymer, as well as amines and the like. Other additives known in the art may also be used, such as antioxidants, photostabilizers, flow modifiers including sintered colloidal silicas such as those sold under the trademark Cab-O-Sil by Cabot Corporation, and the like.

The components of the pressure-sensitive adhesive may be combined and mixed in any order and by any method that (1) provides both a final homogeneous liquid mixture or solution, and (2) allows sufficient time after mixing so that casting or application can be performed before substantial thickening or solidification occurs. Such mixing techniques are well known in the art and may be performed using equipment such as the Liquid Control Corporation TwinFlow ® machine.

When mixing is complete, the mixture is applied to a substrate such as paper, plastic film, release paper, metal foil or the like. Conventional application or casting means can be used to meter and obtain a desired uniform thickness across a given substrate, such as a wire-wound rod, gravure coater, differential roll coater reverse roll coater, knife-over-roll coater or the like.

The coated substrate is generally cured partially or completely by heating before winding, particularly if a solvent is used. However, the coated substrate may be wound before curing if a bulk adhesive without solvent is used. Suitable heating means include circulating air ovens, infrared heaters and heated drums.

The following examples illustrate the present invention more fully.

EXAMPLES

I. Materials

Random Hydroxylated Alkyl Acrylate Liquid Polymer — Control

A random hydroxylated alkyl acrylate liquid polymer was prepared as follows for control comparison purposes by polymerizing a monomer mixture containing 2-hydroxyethyl acrylate.

A 15-gallon reactor was equipped with a twin-blade turbine stirrer, and a feed tank, dip tube and proportioning pump for feeding monomers into the reactor. The reactor was cleaned thoroughly with acetone and dried with nitrogen. The reactor was evacuated three times and the vacuum broken three times with nitrogen. Thereafter a small nitrogen purge was maintained during polymerization. Agitation was begun, and 46.2 lbs. acetone and 3.1 lbs. azoisobutyronitrile were charged to the reactor and stirred for 30 minutes. Agitation was stopped, and a vacuum was drawn and broken with nitrogen. Stirring was resumed while the reactor was heated to 80° C., and the monomer mixture was proportioned into the reactor over a 4-hour period. The following monomer recipe was used:

| MONOMER | PARTS | WT. LBS. |
|---|---|---|
| n-Butyl Acrylate | 72 | 24.5 |
| Acrylonitrile | 15 | 5.1 |
| Diacetone Acrylamide | 5 | 1.8 |
| 2-Hydroxyethyl Acrylate | 8 | 2.7 |
| | 100 | 34.1 |

Proportioning of the monomer mixture was at the rate of 15.4 lbs., 8.7 lbs., 4.4 lbs. and 2.2 lbs. the first, second, third and fourth hours respectively. Heating and stirring of the reaction mixture was continued after proportioning was complete until total solids content was greater than about 38.5 wt.%. At this time a vacuum was drawn on the reactor in order to remove acetone and unreacted monomers. Vacuum drying was continued at 100°–105° C. until total solids was greater than about 99 wt.%.

A liquid polymer weighing 27.6 lbs. was recovered. It was a random hydroxylated poly(n-butyl acrylate/acrylonitrile/diacetone acrylamide/2-hydroxyethyl acrylate) having a Brookfield viscosity at 25° C. of about 1,380,000 cps. The polymer was found to have a hydroxyl number of 38.8 (0.069 Ephr$_{OH}$, i.e., equivalents hydroxyl per 100 weight parts of polymer).

Terminal Hydroxylated Alkyl Acrylate Liquid Polymer — Control

A terminal hydroxylated alkyl acrylate liquid polymer was prepared as follows for control comparison purposes by (1) producing a carboxyl-terminated liquid polymer, (2) coagulating and drying it, and (3) converting it to a hydroxyl-terminated liquid polymer by reaction with ethylene oxide in the presence of trimethylamine.

A 15-gallon reactor was equipped with a twin-blade turbine stirrer, and a feed tank, dip tube and proportioning pump for feeding monomers into the reactor. The reactor was cleaned thoroughly with acetone and dried with nitrogen. The reactor was evacuated three times and the vacuum broken each time with nitrogen. Thereafter a small nitrogen purge was maintained during polymerization. Agitation was begun, 8.2 lbs. acetone and 32.8 lbs. azodicyanovaleric acid solution (about 16 wt.% in acetone) were charged to the reactor with stirring, and the reactor was heated to 50° C. The following monomer recipe was used:

| MONOMER | PARTS | Wt., LBS. |
|---|---|---|
| n-Butyl Acrylate | 90 | 36.0 |
| Butadiene | 5 | 2.1 |
| Acrylonitrile | 5 | 2.1 |
| | 100 | 41.1 |

1.8 lbs. of the above monomer mixture was proportioned into the reactor during a 30-minute period while the reactor was heated from 50° C. to 80° C. The remaining monomer mixture was proportioned into the reactor during a period of 4.5 hours. When proportioning was completed, stirring at 80° C. was continued for 30 minutes, after which the reactor was cooled to 30° C. The product was a cement of a carboxyl-terminated poly(n-butyl acrylate/butadiene/acrylonitrile) liquid polymer, hereinafter called "CTAN."

CTAN coagulation and drying was performed as follows: 21.3 lbs. water was charged to the reactor with low speed stirring for 5 minutes. The reactor contents were allowed to settle for 2 hours. The bottom phase was drawn from the reactor and found to contain 66 wt.% CTAN, while the upper phase contained only 7 wt.% CTAN. The upper phase was discarded, and the CTAN phase was returned to the reactor together with 87 grams of phosphited polyalkyl polyphenol stabilizer. Stirring was resumed, and the reactor contents were vacuum dried at 100°–105° C. until total solids was greater than 98 wt.% CTAN.

CTAN was converted to a hydroxyl-terminated poly(n-butyl acrylate/butadiene/acrylonitrile) liquid polymer by reacting CTAN with ethylene oxide in the presence of trimethylamine as follows. 36 lbs. CTAN and 24 lbs. acetone were charged to a nitrogen-purged reactor and stirred for 1 hour at 60° C. 940 grams ethylene oxide was bubbled into the reaction vessel, and stirring was continued for 5 minutes at 60° C. 190 ml trimethylamine solution (25 wt.% in methanol) was charged to the reactor, which was heated to 95° C. with stirring. Conversion was monitored by titrating samples of the reaction mixture from time to time. Upon completion of reaction, the reactor was cooled rapidly to 45°–50° C. and depressurized. 66.6 ml concentrated HCl was charged to the reactor and stirred for 15 minutes. The polymer was vacuum dried at 100°–105° C. until total solids was greater than 98 wt.%.

A liquid polymer weighing 34 lbs. was recovered. It was a hydroxyl-terminated poly(n-butyl acrylate/butadiene/acrylonitrile) having a Brookfield viscosity at 25° C. of about 328,000 cps. The polymer was found to have a hydroxyl number of 32.5 (0.058 Ephr$_{OH}$, i.e., equivalents of hydroxyl per 100 weight parts of polymer).

Alkyl Acrylate Liquid Polymer Containing Both Random and Terminal Hydroxyl Functionality — Method #1

An alkyl acrylate liquid polymer containing both random and terminal hydroxyl functionality was prepared according to method #1 described heretofore, i.e., by (1) producing a carboxyl-terminated liquid polymer having some random carboxyl functionality (provided by acrylic acid units in the polymer backbone), (2) coagulating and drying it, and (3) converting it to a random- and hydroxyl-terminated liquid polymer by reaction with ethylene oxide in the presence of trimethylamine.

A 15-gallon reactor was equipped with a proportioning pump for feeding monomers into the reactor. The reactor was cleaned thoroughly with acetone and dried with nitrogen. The reactor was evacuated three times and the vacuum broken each time with nitrogen. Thereafter a small nitrogen purge was maintained during polymerization. Agitation was begun, 26.0 lbs. acetone and 1.5 lbs. butadiene were charged to the reactor with stirring, and the reactor was heated to 80° C. At 80° C. 26 lbs. azodicyanovaleric acid solution (about 16 wt.% in acetone) was charged to the reactor, and proportioning was begun of the following monomer mixture:

| MONOMER | PARTS | WT., LBS. |
|---|---|---|
| n-Butyl Acrylate | 90 | 27.8 |
| Acrylonitrile | 5 | 1.6 |
| Acrylic Acid | 5 | 1.6 |
| | 100 | 31.0 |

Proportioning was continued over a 4-hour period, until a total of 28.5 lbs. of the monomer mixture was charged. When proportioning was completed, stirring at 80° C. was continued for 5 minutes, after which the reactor was cooled to 30° C. The product was a cement of a carboxyl-terminated poly(n-butyl acrylate/-butadiene/acrylonitrile/acrylic acid) liquid polymer, hereinafter called "CTANX." Two batches of CTANX were made by the above procedure.

CTANX coagulation and drying was performed as follows. Both CTANX batches and 100 lbs. water were charged to a coagulator with low speed stirring for 5 minutes. The reactor contents were allowed to settle for 2 hours. The bottom phase was drawn from the reactor and found to contain 46.5 wt.% CTANX, while the upper phase contained only 1.5 % CTANX. The upper phase was discarded, and the CTANX phase was returned to the reactor together with 120 grams of a phosphited polyalkyl polyphenol stabilizer. Stirring was resumed, and the reactor contents were vacuum dried at 100°–105° C. until total solids was greater than 98 wt.% CTANX.

CTANX was converted to a hydroxyl-terminated poly(n-butyl acrylate/butadiene/acrylonitrile/hydroxyl-containing ester of acrylic acid) by reacting CTANX with ethylene oxide in the presence of trimethylamine as follows. 28 lbs. acetone was charged to the nitrogen-purged reactor containing 34 lbs. CTANX, and stirring was continued for 1.5 hours at 60° C. 2.1 lbs. ethylene oxide was bubbled into the reaction vessel, and stirring was continued for 5 minutes at 60° C. 117 ml trimethylamine solution (25 wt.% in methanol) was charged to the reactor, which then was heated to 95° C. with stirring. Conversion was monitored by titrating samples of the reaction mixture from time to time. Upon completion of reaction, the reactor was cooled rapidly to 45°–50° C. and depressurized. 40 ml concentrated HCl was charged to the reactor and stirred for 15 minutes. The polymer was vacuum dried at 100°–105° C. until total solids was greater than 85 wt.%.

A liquid polymer weighing 42 lbs. was recovered. It was a poly(n-butyl acrylate/butadiene/acrylonitrile/-hydroxyl-containing acrylate ester) having both terminal and random hydroxyl functionality. The polymer had a Brookfield viscosity at 25° C. of about 500,000 cps., and a hydroxyl number of 57.8 (0.103 Ephr$_{OH}$, i.e., equivalents of hydroxyl per 100 weight parts of polymer).

Prepolymer of Glycol and Diisocyanate

Component (B) of the pressure-sensitive adhesive in the examples was a prepolymer of (1) polytetramethylene ether glycol and (2) toluene diisocyanate. The prepolymer was found to have a molecular weight of about 1,350 and to contain about 6 wt.% free NCO. The prepolymer is sold under the trademark Adiprene L-167 by E. I. duPont de Nemours & Co.

II. TEST PROCEDURES

Each adhesive was tested using three standard Pressure Sensive Tape Council (PSTC) standard test methods: (1) rolling ball tack (PSTC-6, issued 10/64); (2) 180° peel adhesion (PSTC-1, revised 4/66); and (3) shear adhesion at 70° C. (commonly called static shear - see PSTC-7, revised 4/66).

A maximum desirable test value for rolling ball tack after curing of a given test sample was 4 inches. Minimum desirable test values after curing of a given sample were 16 oz./inch for 180° peel adhesion and 48 hours for shear adhesion (static shear).

In each example (1) a hydroxylated liquid polymer was mixed with (2) Adiprene L-167. Mixing was done by hand using a spatula. Each mixture was spread 1-mil thick between Mylar sheets and cured at 150° C. for 2 minutes, after which the above tests were performed.

III. EXAMPLES 1 – 3

Examples 1 – 3 demonstrate that an alkyl acrylate liquid polymer having both terminal and random hydroxyl functionality is essential in order to produce an adhesive having a full range of desirable adhesive properties, including excellent rolling ball tack, 180° peel adhesion and shear adhesion (static shear). Adiprene L-167 was the diisocyanate prepolymer used in each example.

Example 1 sets forth test results for an adhesive composition of the present invention, i.e., the reaction product of (A) an n-butyl acrylate liquid copolymer containing both terminal and random hydroxyl functionality, and (B) Adiprene L-167 (a prepolymer of polytetramethylene ether glycol with an excess amount of toluene diisocyanate). The adhesive was found to have excellent rolling ball tack, 180° peel adhesion and shear adhesion, since both terminal and random hydroxyl functionality were present in the alkyl acrylate liquid polymer component. Such excellent properties were maintained at varying hydroxyl/isocyanate (OH/NCO) equivalents ratios.

In sharp contrast, adhesives in examples 2 and 3 were deficient in one or more of the three adhesive properties at varying OH/NCO ratios. A random hydroxylated n-butyl acrylate liquid polymer in example 2 produced an adhesive deficient in all three properties — rolling ball tack, 180° peel adhesion, and shear adhesion. A terminal hydroxylated n-butyl acrylate liquid polymer in example 3 produced an adhesive which was also deficient in all three properties, except for rolling ball tack at a 1/1 OH/NCO equivalents ratio.

TABLE I

| | PRESSURE-SENSITIVE ADHESIVE TEST DATA | | | | |
|---|---|---|---|---|---|
| Example | Type of Hydroxyl Functionality in n-Butyl Acrylate Liquid Polymer | OH/NCO Equivalents Ratio | Rolling Ball Tack (in.) | 180° Peel Adhesion (oz.) | Shear Adhesion at 70° C (hrs.) |
| 1 | Both Terminal and Random | 2.5 | 2.84 | 22.6 | Greater than 170 |
|   |   | 3.0 | 1.90 | 29.0 | Greater than 170 |
| 2 | Random | 2.5 | Greater than 9.7 | Splits* | Less than .01 |
|   |   | 3.0 | Greater than 11.0 | Splits* | Less than .01 |
| 3 | Terminal | 1.0 | 1.05 | Splits* | .02 |
|   |   | 2.5 | ** | ** | ** |
|   |   | 3.0 | ** | ** | ** |

*Test sample failed cohesively, leaving adhesive on both surfaces.
**Adhesive did not cure, and test data could not be obtained.

IV. EXAMPLES 4 – 8

A liquid poly (n-butyl acrylate/butadiene/hydroxyl-containing acrylic acid ester) containing both random and terminal hydroxyl functionality was prepared by the general method used for preparing the random and terminal hydroxylated liquid polymer of example 1, except that no acrylonitrile was used. The monomers were charged in the following proportions:

| MONOMER | PARTS |
|---|---|
| n-Butyl Acrylate | 90 |
| Butadiene | 5 |
| Acrylic Acid | 5 |

The sample general method was used to make the random and terminal hydroxylated liquid polymer, i.e., (1) a carboxyl-terminated liquid polymer having random carboxyl functionality (provided by acrylic acid units in the polymer backbone) was produced, (2) the step-1 polymer was coagulated and dried, and (3) it was then converted to a hydroxyl-terminated liquid polymer by reaction with ethylene oxide in the presence of trimethylamine. The poly(n-butyl acrylate/butadiene/hydroxyl-containing acrylic acid ester) having both terminal and random hydroxyl groups had a Brookfield viscosity at 25° C. of about 410,000 cps., and a hydroxyl number of 46 (0.082 Ephr$_{OH}$, i.e., equivalents of hydroxyl per 100 weight parts of polymer).

This hydroxylated liquid polymer was hand mixed using a spatula with varying amounts of Adiprene L-167 (i.e., at varying OH/NCO equivalents ratio) and solvent in slightly varying thicknesses on Mylar film and cured for 2 minutes at 150° C. Each sample was tested for rolling ball tack, 180° peel adhesion and shear adhesion.

The pressure-sensitive adhesives of examples 4 to 8 are within the scope of the present invention. In each example rolling ball tack, 180° peel adhesion and shear adhesion were found to be uniformly excellent at all OH/NCO ratios tested using the test criteria defined heretofore.

Recipes and test data are set forth in Tables II and III respectively.

TABLE II

| | | PRESSURE-SENSITIVE ADHESIVE RECIPE | | |
|---|---|---|---|---|
| Example | OH/NCO Equivalents Ratio | Terminal and Random Hydroxylated Liquid Polymer (Grams) | Adiprene L-167 (Grams) | Solvent (Grams)* |
| 4 | 3.0 | 15 | 2.66 | 1.96 |
| 5 | 3.2 | 15 | 2.49 | 1.94 |
| 6 | 3.4 | 15 | 2.34 | 1.92 |
| 7 | 3.6 | 15 | 2.21 | 1.91 |
| 8 | 3.8 | 15 | 2.10 | 1.90 |

*Solvent was 73 wt. % toluene and 27 wt. % ethyl acetate.

TABLE III

| | PRESSURE-SENSITIVE ADHESIVE TEST DATA | | | | |
|---|---|---|---|---|---|
| EXAMPLE | OH/NCO EQUIVALENTS RATIO | ADHESIVE THICKNESS (MILS) | ROLLING BALL TACK (IN.) | 180 PEEL ADHESION (OZ.) | SHEAR ADHESION at 70° C (HRS.) |
| 4 | 3.0 | 1.0 | 1.4 | 26 | Greater Than 163** |
| 5 | 3.2 | 1.0 | 1.4 | 29 | Greater Than 163** |
| 6 | 3.4 | 1.0 | 1.4 | 29 | Greater Than 163** |
| 7 | 3.6 | 1.1 | 1.3 | 35* | Greater Than 163** |
| 8 | 3.8 | 1.3 | 1.1 | 36* | Greater Than 163** |

*A very slight cohesive failure of the adhesive film occurred, but the test result was still judged acceptable.
**No failure occurred, and the test was terminated.

The compositions of this invention are useful as pressure-sensitive adhesives, either in solution or in bulk for labels, other laminate structures and the like.

We claim:

1. A composition comprising (A) at least one alkyl acrylate liquid polymer containing both terminal and random hydroxyl functionality, and (B) at least one prepolymer of a polyalkylene ether glycol or polyester glycol with an excess amount of an aromatic diisocyanate, wherein
   (1) said alkyl acrylate liquid polymer contains an average from about 1.4 to about 6 hydroxyl groups per molecule, and contains polymerized therein at least about 65 wt.% of at least one alkyl acrylate, the alkyl group of which contains from 3 to 10 carbon atoms,
   (2) said polyalkylene ether glycol contains from 3 to 6 carbon atoms per alkylene group and has a molecular weight from about 400 to about 2,000,
   (3) said aromatic diisocyanate contains from 8 to about 24 carbon atoms,
   (4) said prepolymer has a molecular weight from about 900 to about 3,000, and
   (5) the ratio of hydroxyl equivalents to free isocyanate equivalents is from about 0.7/1 to about 4.5/1.

2. A composition of claim 1 wherein said alkyl acrylate liquid polymer has a molecular weight from about 1,000 to about 6,000, and said prepolymer contains from about 2 wt.% to about 10 wt.% excess isocyanate based upon prepolymer weight.

3. A composition of claim 1 wherein said alkyl acrylate liquid polymer contains copolymerized therein at least one other olefinically unsaturated monomer.

4. A composition of claim 3 wherein said olefinically unsaturated monomer is a vinylidene comonomer containing at least one terminal $CH_2=C<$ group per molecule.

5. A composition of claim 4 wherein said vinylidene comonomer is selected from the group consisting of (a) dienes containing 4 to 10 carbon atoms, (b) vinyl nitriles having the formula

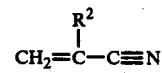

wherein $R_2$ is hydrogen or an alkyl group containing 1 to 3 carbon atoms, (c) acrylates having the formula

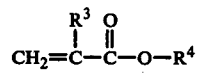

wherein $R^3$ is hydrogen or an alkyl radical containing 1 to 3 carbon atoms, and $R^4$ is hydrogen or an alkyl radical containing 1, 2 or 11 to 18 carbon atoms, or an alkoxyalkyl, alkylthioalkyl, or cyanoalkyl radical containing 2 to 12 carbon atoms, or wherein $R^3$ is an alkyl radical containing 1 to 3 carbon atoms and $R^4$ an alkyl radical containing 3 to 10 carbon atoms, (d) vinyl aromatics having the formula

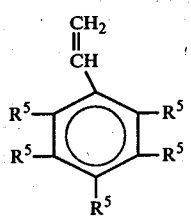

wherein $R^5$ is hydrogen, halogen or an alkyl radical containing 1 to 4 carbon atoms, (e) vinyl and allyl esters of carboxylic acids containing 2 to 8 carbon atoms, (f) vinyl and allyl ethers of alkyl radicals containing 1 to 8 carbon atoms (g) monoolefins containing 2 to 14 carbon atoms, (h) vinyl halides, (i) divinyls and diacrylates, (j) amides of $\alpha,\beta$-olefinically unsaturated carboxylic acids containing 2 to 8 carbon atoms, (k) hydroxyl-containing vinylidene monomers, and (1) diacetone acrylamide.

6. A composition of claim 5 wherein said vinylidene comonomer is selected from the group consisting of said dienes, vinyl nitriles, acrylates, hydroxyl-containing vinylidene monomers and diacetone acrylamide.

7. A composition of claim 6 wherein said vinylidene comonomer is selected from the group consisting of butadiene, acrylonitrile, ethyl acrylate, propyl acrylate, a hydroxyl-containing ester of acrylic acid, and diacetone acrylamide.

8. A composition of claim 7 wherein component B is a prepolymer of polytetramethylene ether glycol with toluene diisocyanate, or a prepolymer of polypropylene ether glycol with toluene diisocyanate.

9. A composition of claim 8 wherein the backbone of said alkyl acrylate liquid polymer (component A) contains polymerized therein n-butyl acrylate, butadiene, and a hydroxyl-containing ester of acrylic acid.

10. A composition of claim 9 wherein said hydroxyl-containing ester of acrylic acid is 2-hydroxyethyl acrylate.

11. A composition of claim 8 wherein the backbone of said alkyl acrylate liquid polymer (component A) contains polymerized therein n-butyl acrylate, butadiene, acrylonitrile, and a hydroxyl-containing ester of acrylic acid.

12. A composition of claim 11 wherein said hydroxyl-containing ester of acrylic acid is 2-hydroxyethyl acrylate.

13. A composition of claim 8 wherein the backbone of said alkyl acrylate liquid polymer (component A) contains polymerized therein n-butyl acrylate, ethyl acrylate and a hydroxyl-containing ester of acrylic acid.

14. A composition of claim 13 wherein said hydroxyl-containing ester of acrylic acid is 2-hydroxyethyl acrylate.

15. A cured composition of claim 1.

16. A laminate structure having as adhesive a composition comprising (A) at least one alkyl acrylate liquid polymer containing both terminal and random hydroxyl functionality, and (B) at least one prepolymer of a polyalkylene ether glycol or polyester glycol with an excess amount of an aromatic diisocyanate, wherein
(1) said alkyl acrylate liquid polymer contains an average from about 1.4 to about 6 hydroxyl groups per molecule, and contains polymerized therein at least about 65 wt.% of at least one alkyl acrylate, the alkyl group of which contains from 3 to 10 carbon atoms,
(2) said polyalkylene ether glycol contains from 3 to 6 carbon atoms per alkylene group and has a molecular weight from about 400 to about 2,000,
(3) said aromatic diisocyanate contains from 8 to about 24 carbon atoms,
(4) said prepolymer has a molecular weight from about 900 to about 3,000, and
(5) the ratio of hydroxyl equivalents to free isocyanate equivalents is from about 0.7/1 to about 4.5/1.

17. A laminate structure of claim 16 wherein said alkyl acrylate liquid polymer has a molecular weight from about 1,000 to about 6,000 and said prepolymer contains from about 2 wt.% to about 10 wt.% excess isocyanate based upon prepolymer weight.

18. A laminate structure of claim 16 wherein said alkyl acrylate liquid polymer contains copolymerized therein at least one other olefinically unsaturated monomer.

19. A laminate structure of claim 18 wherein said olefinically unsaturated monomer is a vinylidene monomer containing at least one terminal $CH_2=C<$ group per molecule.

20. A laminate structure of claim 19 wherein said vinylidene comonomer is selected from the group consisting of (a) dienes containing 4 to 10 carbon atoms, (b) vinyl nitriles having the formula

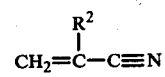

wherein $R^2$ is hydrogen or an alkyl group containing 1 to 3 carbon atoms, (c) acrylates having the formula

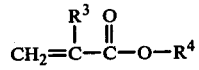

wherein $R^3$ is hydrogen or an alkyl radical containing 1 to 3 carbon atoms, and $R^4$ is hydrogen or an alkyl radical containing 1, 2 or 11 to 18 carbon atoms, or an alkoxyalkyl, alkylthioalkyl, or cyanoalkyl radical containing 2 to 12 carbon atoms, or wherein $R^3$ is an alkyl radical containing 1 to 3 carbon atoms and $R^4$ and alkyl radical containing 3 to 10 carbon atoms, (d) vinyl aromatics having the formula

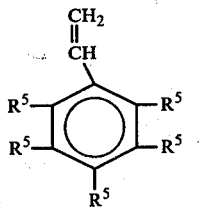

wherein $R^5$ is hydrogen, halogen or an alkyl radical containing 1 to 4 carbon atoms, (e) vinyl and allyl esters of carboxylic acids containing 2 to 8 carbon atoms, (f) vinyl and allyl ethers of alkyl radicals containing 1 to 8 carbon atoms, (g) monoolefins containing 2 to 14 carbon atoms, (h) vinly halides, (i) divinyls and diacrylates, (j) amides of $\alpha,\beta$-olefinically unsaturated carboxylic acids containing 2 to 8 carbon atoms, (k) hydroxyl-containing vinylidene monomers, and (1) diacetone acrylamide.

21. A laminate structure of claim 20 wherein said vinylidene comonomer is selected from the group consisting of said dienes, vinyl nitriles, acrylates, hydroxyl-containing vinylidene monomers and diacetone acrylamide.

22. A laminate structure of claim 21 wherein said vinylidene comonomer is selected from the group consisting of butadiene, acrylonitrile, ethyl acrylate, propyl acrylate, a hydroxyl-containing ester of acrylic acid, and diacetone acrylamide.

23. A laminate structure of claim 22 wherein component B is a prepolymer of polytetramethylene ether glycol with toluene diisocyanate, or a prepolymer of polypropylene ether glycol with toluene diisocyanate.

24. A laminate structure of claim 23 wherein the backbone of said alkyl acrylate liquid polymer (component A) contains polymerized therein n-butyl acrylate, butadiene, and a hydroxyl-containing easter of acrylic acid.

25. A laminate structure of claim 24 wherein said hydroxyl-containing ester of acrylic acid is 2-hydroxyethyl acrylate.

26. A laminate structure of claim 23 wherein the backbone of said alkyl acrylate liquid polymer (component A) contains polymerized therein n-butyl acrylate, butadiene, acrylonitrile, and a hydroxyl-containing ester of acrylic acid.

27. A laminate structure of claim 26 wherein said hydroxyl-containing ester of acrylic acid is 2-hydroxyethyl acrylate.

28. A laminate structure of claim 23 wherein the backbone of said alkyl acrylate liquid polymer (component A) contains polymerized therein n-butyl acrylate, ethyl acrylate and a hydroxyl-containing ester of acrylic acid.

29. A laminate structure of claim 28 wherein said hydroxyl-containing ester of acrylic acid is 2-hydroxyethyl acrylate.

30. A cured laminate structure of claim 16.

31. A process comprising mixing and curing a composition comprising (A) at least one alkyl acrylate liquid polymer containing both terminal and random hydroxyl functionality, and (B) at least one prepolymer of a polyalkylene ether glycol or polyester glycol with an excess amount of an aromatic diisocyanate, wherein
  (1) said alkyl acrylate liquid polymer contains an average from about 1.4 to about 6 hydroxyl groups per molecule, and contains polymerized therein at least about 65 wt.% of at least one alkyl acrylate, the alkyl group of which contains from 3 to 10 carbon atoms,
  (2) said polyalkylene ether glycol contains from 3 to 6 carbon atoms per alkylene group and has a molecular weight from about 400 to about 2,000,
  (3) said aromatic diisocyanate contains from 8 to about 24 carbon atoms,
  (4) said prepolymer has a molecular weight from about 900 to about 3,000, and
  (5) the ratio of hydroxyl equivalents to free isocyanate equivalents is from about 0.7/1 to about 4.5/1.

32. A composition of claim 8 wherein the backbone of said alkyl acrylate liquid polymer (component A) contains polymerized therein n-butyl acrylate and a hydroxyl-containing ester of acrylic acid.

33. A composition of claim 32 wherein said hydroxyl-containing ester of acrylic acid is 2-hydroxyethyl acrylate.

34. A laminate structure of claim 23 wherein the backbone of said alkyl acrylate liquid polymer (component A) contains polymerized therein n-butyl acrylate and a hydroxyl-containing ester of acrylic acid.

35. A laminate structure of claim 34 wherein said hydroxyl-containing ester of acrylic acid is 2-hydroxyethyl acrylate.

* * * * *